Figure 1:
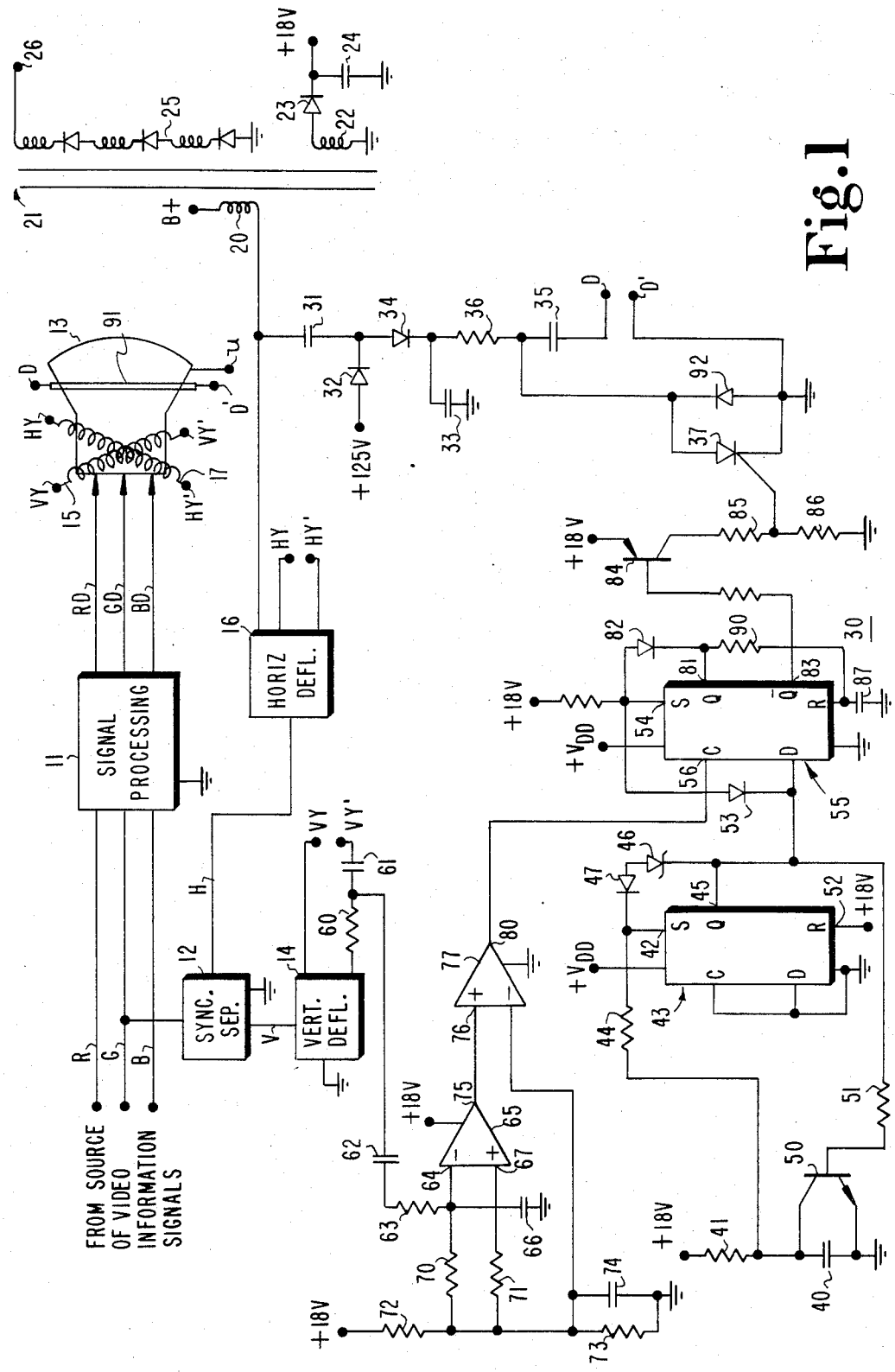

United States Patent [19]

Frantz et al.

[11] Patent Number: 4,535,270
[45] Date of Patent: Aug. 13, 1985

[54] RESONANT DEGAUSSING WITHOUT RESIDUAL MAGNETISM

[75] Inventors: Keith R. Frantz, Myerstown; Robert A. Barnes, Bainbridge; Bruce G. Marks, Lancaster, all of Pa.

[73] Assignee: RCA Corporation, Princeton, N.J.

[21] Appl. No.: 553,007

[22] Filed: Nov. 17, 1983

[51] Int. Cl.³ .............................................. H01J 29/06
[52] U.S. Cl. ...................................... 315/8.0; 315/1.0
[58] Field of Search .................................. 315/8.0, 1.0

[56] References Cited

U.S. PATENT DOCUMENTS

| | | | |
|---|---|---|---|
| 3,733,524 | 5/1973 | Cooksey et al. | 317/157.5 |
| 3,965,386 | 6/1976 | Duistermaat et al. | 315/8 |
| 4,153,858 | 5/1979 | Schylander | 315/8 |
| 4,380,716 | 4/1983 | Romeo et al. | 315/8.0 |
| 4,441,052 | 4/1984 | Willis | 315/8.0 |

*Primary Examiner*—Harold Dixon
*Attorney, Agent, or Firm*—Paul J. Rasmussen; Joseph Laks; Scott J. Stevens

[57] ABSTRACT

A resonant degaussing circuit provides rapid recovery for use with computer monitors or video display apparatus where frequent movement of the display apparatus occurs. The degaussing circuit comprises a capacitor in parallel with a degaussing coil. Triggering of an SCR causes the capacitor to discharge, so that it resonates with the degaussing coil to produce the desired AC degaussing current. The SCR is triggered only when the vertical deflection current is substantially zero, in order to eliminate interference of the vertical flux with the degaussing current.

5 Claims, 3 Drawing Figures

RESONANT DEGAUSSING WITHOUT RESIDUAL MAGNETISM

This invention relates to degaussing circuits for video display equipment, and in particular, to degaussing circuits having rapid recovery.

Color cathode ray tubes require periodic degaussing or demagnetization to counteract the effects of the earth's magnetic field or of electromagnetic fields produced by nearby electrical devices, such as motors or appliances. These fields may magnetize metallic portions of the cathode ray tube, such as the shadow mask, causing a degradation of the color purity of the tube. Video display apparatus, such as television receivers and computer or video display monitors, usually incorporate a degaussing circuit which is operative when the apparatus is energized to produce an alternating current field that decays toward zero in order to demagnetize the metallic components in the vicinity of the tube and of the tube itself.

A common type of degaussing circuit is powered from the AC line supply, which in the United States has a frequency of 60 Hz. This type of degaussing circuit ordinarily utilizes a positive temperature coefficient resistor, or thermistor, or other temperature sensitive component, which increases in resistance as it heats due to degaussing current flow. This causes the alternating degaussing current to decay in a manner that provides demagnetization of the cathode ray tube metallic components. A small residual current will continue to flow in the thermistor to keep it heated as long as the display apparatus is energized.

Although this type of degaussing circuit is quite effective for television receivers, it has some disadvantages when used with computer monitors or video display terminals that are subject to frequent movement or reorientation for different viewers. Such movement also reorients the cathode ray tube with respect to the earth's magnetic field, thereby requiring degaussing of the tube. Each movement of the terminal may require degaussing to be performed. A degaussing circuit incorporating a thermistor requires a relatively long recovery period after power is removed to enable the thermistor to cool sufficiently. This recovery period may be of the order of twenty minutes, which is undesirable when frequent movement of the display terminal is contemplated. Additionally, computer monitors or video display terminals require input and output capability for direct video and RGB signals. This requires electrical isolation between the input and output terminals and the AC line, which is often accomplished by isolating the complete input and output circuits, including the cathode ray tube, from the AC line rather than just the input and output terminals. Since the degaussing coil is not isolated from the AC line, it must be carefully insulated from the tube and surrounding circuits.

A resonant or ring-down degaussing circuit overcomes some of the previously described disadvantages of the thermistor degaussing circuit. The resonant degaussing circuit operates by causing a capacitor connected in parallel with the degaussing coil to resonate with the coil in an oscillating manner. The finite Q of the resonant circuit causes the degaussing current to decay in the desired manner to effect demagnetization of the display apparatus metallic parts. Recovery of the degaussing circuit is very fast and requires only the time needed to recharge the capacitor, so that degaussing may be accomplished as needed without turning off the display apparatus. Additionally, the degaussing coil and resonant capacitor may be electrically isolated from the AC line, thereby simplifying insulation requirements.

The resonant frequency of the degaussing circuit is of the order of 2 kHz, so that degaussing is completed in less than .5 milliseconds. This time period is short compared to the vertical deflection interval, so that stray flux from the vertical deflection coils may interfere with the degaussing field resulting in a residual magnetism of the metallic parts of the tube. This may cause purity misregister on the display screen of the tube. This problem occurs in particular with deflection yokes having toroidally wound vertical deflection coils, which produce large stray fields.

In order to eliminate the problem of interfering stray vertical fields, it is necessary either to disable the vertical scan during degaussing, which is undesirable when degaussing is to take place during operation of the display apparatus, or to control the degaussing operation so that it occurs when the vertical deflection field is close to its minimum value, so that little or no stray field is produced.

In accordance with the present invention, a degaussing circuit for a cathode ray tube of a video display apparatus, which incorporates means for providing vertical and horizontal deflection through a deflection yoke, comprises a source of voltage and a capacitor charged from the source of voltage. A degaussing coil is disposed about the cathode ray tube. A circuit provides an output signal as an indication of substantially zero vertical deflection current. A switch is responsive to the output signal for coupling the capacitor to the degaussing coil in order to generate a degaussing current in the coil. The degaussing current decays substantially to zero during a fraction of the vertical deflection interval.

Figure 2:
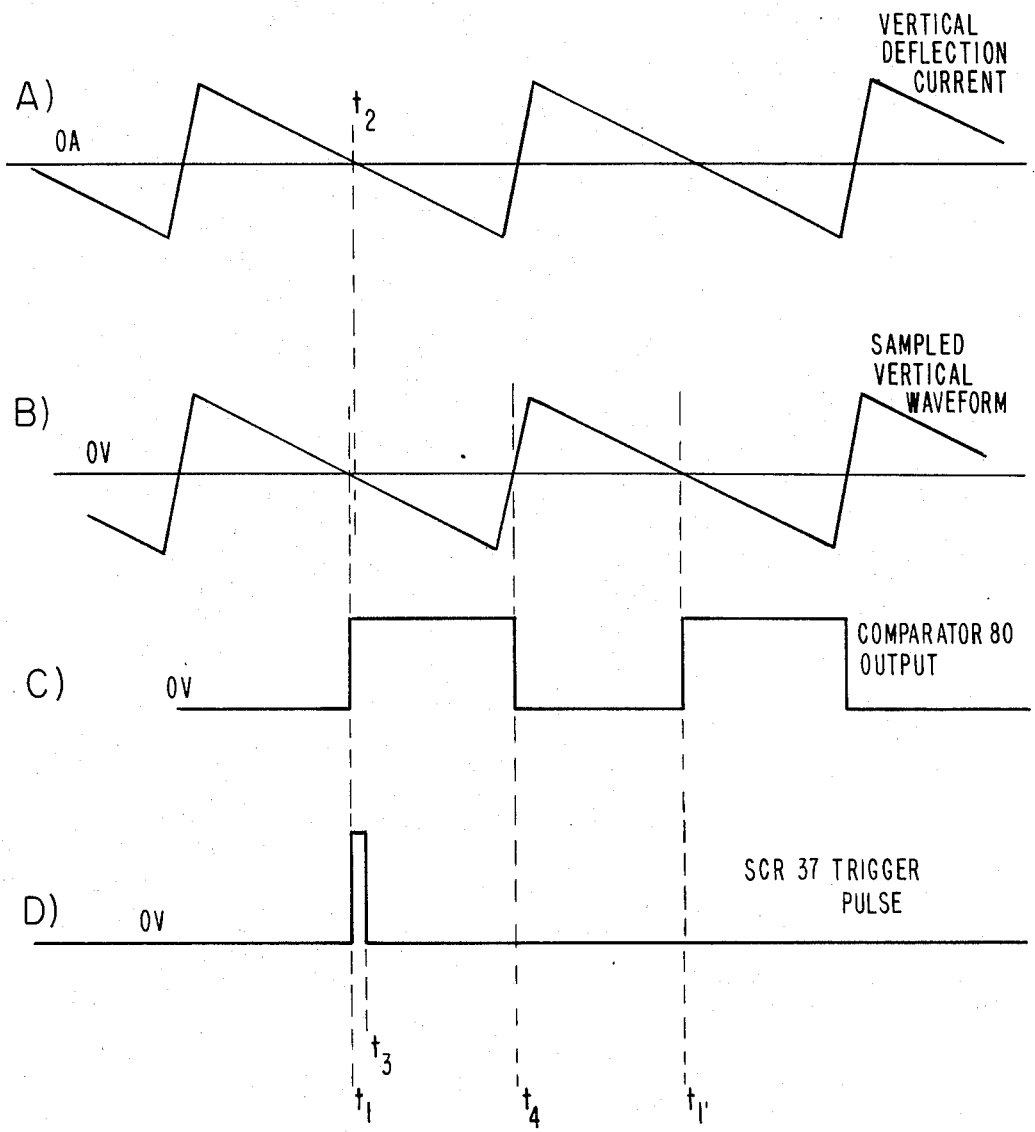
Figure 3:
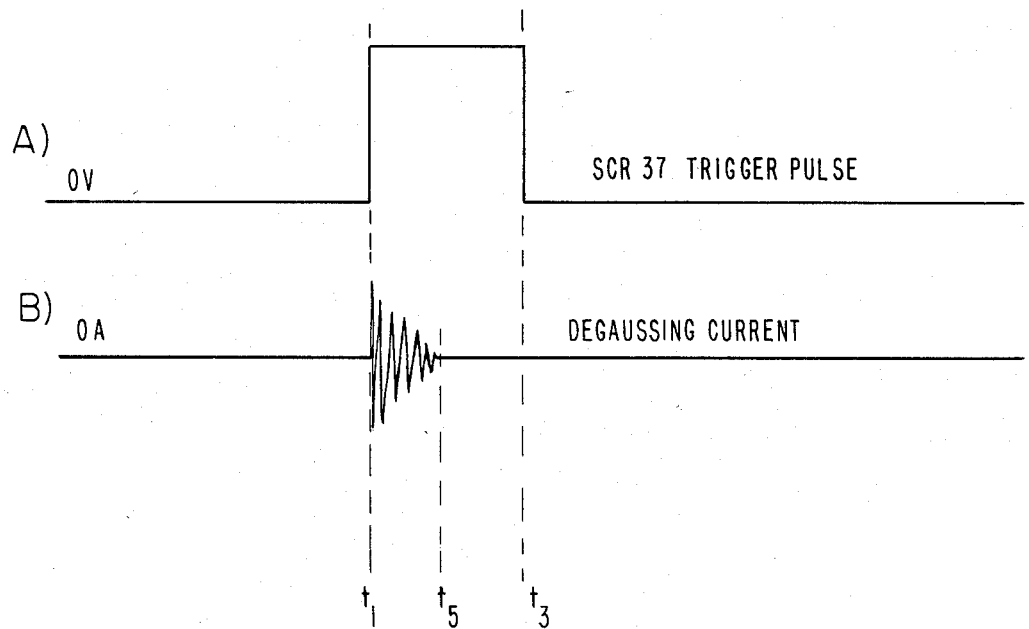

In the accompanying drawing,

FIG. 1 is a schematic and block diagram of a portion of a video display apparatus, incorporating a degaussing circuit constructed in accordance with an aspect of the present invention; and FIGS. 2 and 3 illustrate waveforms associated with the circuit of FIG. 1.

Referring to FIG. 1, there is shown a schematic and block diagram of a portion of a video display apparatus which receives video information signals from, for example, a computer. The video information signals may be of the form of a composite video signal incorporating chrominance and luminance information along with horizontal and vertical synchronizing information and a color oscillator burst signal. The video information signal may be provided as either a modulated or as a base band video signal. The video information signal may also be of the form of separate red, green and blue color signals (RGB signals) with the synchronizing signals incorporated in one of the color signals or as a separate input. The form of the video information signal will, of course, depend on the design of the video information signal source. For illustrative purposes, the circuit of FIG. 1 is shown in a form which would be responsive to separate RGB signals having demodulated, or base band, video information.

The video information signal is provided as RGB signals from a source of video information to signal processing circuits 11. The green video signal is also applied to a synchronizing pulse separator circuit 12. The signal processing circuits provide red, green and blue drive signals (RD, GD, BD) to the electron gun assembly, not shown, of a cathode ray tube 13.

The synchronizing pulse separator circuit 12 provides vertical synchronizing pulses on a conductor V to a vertical or field rate deflection circuit 14 which provides a vertical deflection current in a vertical deflection winding 15 disposed on the kinescope 13 via terminals VY and VY'. Synchronizing pulse separator circuit 12 also provides horizontal or line rate synchronizing pulses on a conductor H which are applied to a horizontal deflection circuit 16 which generates horizontal deflection current in a deflection winding 17, also disposed on cathode ray tube 13 via terminals HY and HY'.

The horizontal deflection circuit 16 also generates horizontal retrace pulses which are applied to winding 20 of a power supply transformer 21. Power supply transformer 21 is shown as illustratively comprising a secondary winding 22 which, via rectifying diode 23 and a filter capacitor 24, provides a source of voltage of the order of +18 volts, which may be used to power other receiver circuits. Transformer 21 may comprise other secondary windings (not shown) which provide other voltage supplies for circuits that operate at other voltage levels. Power transformer 21 also comprises high voltage winding 25 which generates a high voltage or ultor potential at a terminal 26 which is applied to the ultor terminal U of cathode ray tube 13.

In accordance with an aspect of the present invention, there is provided a degaussing circuit 30 of the resonant or ring-down type. When the video display apparatus is energized, horizontal retrace pulses having an amplitude of the order of 800 volts begin to charge capacitor 31. Diode 32 clamps capacitor 31 to the +125 volt supply in order to increase the voltage across capacitor 31 to approximately 925 volts. The voltage across capacitor 31 than charges capacitor 33 to approximately 925 volts through rectifying diode 34 during the course of 5-10 horizontal deflection cycles.

The voltage developed across capacitor 33 causes capacitor 35 to also become charged to 925 volts through current limiting resistor 36. Resistor 36 limits the current flow to prevent the generation of any electromagnetic fields that could magnetize metallic components of the video display apparatus. Capacitor 35 becomes fully charged in approximately 2 seconds. With capacitor 35 charged, degaussing circuit 30 becomes enabled and is energized when SCR 37 is triggered.

The trigger pulses for SCR 37 are generated in the following manner. The +18 volt supply will cause capacitor 40 to charge to approximately 9 volts through resistor 41. This voltage, applied to the SET input 42 of flip-flop 43 through resistor 44, causes the Q output 45 of flip-flop 43 to change to a logic 1 state, having a level of approximately +18 volts. This voltage, applied to the base of transistor 50 through resistor 51, causes transistor 50 to conduct, thereby discharging capacitor 40. Zener diode 46 and diode 47 cause a voltage to be applied to input 42 of flip-flop 43 to maintain flip-flop 43 in its logic 1 state. The voltage applied to the SET input 42 will be approximately 6 volts below the Q output 45 level of +18 volts, due to the voltage drop provided by zener diode 46 and diode 47. The lower voltage at input 42 provides hysteresis to allow flip-flop 43 to reset quickly when power is removed temporarily in order to allow degaussing to occur when power is reapplied. The hysteresis effect operates as follows. Both the SET input 42 and the RESET input 52 require approximately 9 volts to maintain a logic 1 state. Since input 42 is held at about 6 volts below that of input 52 by action of zener diode 46 and diode 47, removal of power from flip-flop 43 will cause the SET input 42 to lose its logic 1 state while the RESET input 52 is still in a logic 1. This causes flip-flop 43 to reset.

A logic 1 at output 45 will cause diode 53 to become reverse biased which applies a voltage to the SET input 54 of flip-flop 55 sufficient to allow flip-flop 55 to go to a logic 1 state. Flip-flop 55 does not change to a logic 1 state, however, until a positive going pulse is received at CLOCK input 56.

The positive going pulse at CLOCK input 56 is generated as follows. A vertical rate sawtooth signal representative of vertical yoke current is sampled via sampling resistor 60 and capacitor 61 from the return conductor of the vertical deflection winding 15. Vertical deflection current is shown in FIG. 2(A). The sampled waveform, shown in FIG. 2(B), is applied via a capacitor 62 and a resistor 63 to the inverting input 64 of an operational amplifier or comparator 65. The sampled waveform is AC coupled so that it varies positively and negatively about zero. The time constant of the circuit which applies the sampled waveform to comparator 65 causes the waveform to pass through zero at time $t_1$ slightly before the center of the vertical trace interval, time $t_2$, as shown in FIGS. 2(A) and 2(B). This permits degaussing to begin just before the middle of vertical trace so that it ends before any appreciable vertical deflection current has been produced. Capacitor 66, also coupled to inverting input 64, filters any horizontal rate signals from the vertical rate sawtooth signal that may have been undesirably coupled into the vertical rate current via the deflection yoke. Both the inverting input 64 and the noninverting input 67 are biased to one half the supply voltage, i.e., 9 volts, by resistors 70 and 71, respectively, and by a voltage divider established by resistors 72 and 73. Capacitor 74 provides a bypass path for the voltage divider. The sampled vertical waveform is referenced to this bias voltage and swings above and below it. The gain of comparator 65 is very high, so that the output 75 will essentially switch between zero and +18 volts as the voltage on the inverting input 64 falls below that on the noninverting input 67. This occurs as the sawtooth waveform passes from positive to negative near the center of vertical trace, which is the vertical current zero crossing. The output 75 of comparator 65 is connected to the noninverting input 76 of a comparator 77. As the output 75 of comparator 65 goes high at the vertical deflection current zero crossing, the output 80 of comparator 77 will also go high, as shown in FIGURE 2(C). Comparator 77 shortens the rise time of the positive going pulse from comparator 65.

This positive going pulse is applied to the CLOCK input 56 of flip-flop 55 and causes the Q output 81 of flip-flop 55 to change to a logic 1 state. This reverse biases diode 82 which applies a voltage to SET input 54 that maintains flip-flop 55 in a logic 1 state until power is removed. The NOT Q output 83 of flip-flop 55 will switch to a logic 0 state which forward biases transistor 84, causing it to saturate so that current flows through resistors 85 and 86. The voltage drop across resistor 86 will trigger SCR 37, initiating the degaussing operation. The logic 1 state of approximately +18 volts on Q output 81 of flip-flop 55 causes capacitor 87 to charge via resistor 90. After approximately 12 milliseconds, flip-flop 55 is reset, which causes both Q output 81 and NOT Q output 83 to maintain a logic 1 state. When NOT Q output 83 switches to a logic 1 state, transistor 84 becomes reverse biased, and SCR 37 turns off. The SCR 37 trigger pulse is shown in FIG. 2(D), and expanded in FIG. 3(A).

When SCR 37 is triggered into conduction, capacitor 35 discharges through SCR 37 and the degaussing coil 91, located on cathode ray tube 13, via terminals D and D'. As capacitor 35 discharges, the current flow in degaussing coil 91 causes the magnetic field produced by the coil to increase. When capacitor 35 is completely discharged, current will continue to flow in degaussing coil 91, and capacitor 35 will become oppositely charged. The magnetic field produced by coil 91 will collapse as the degaussing current falls, until the current is zero and capacitor 35 is charged. Capacitor 35 will then discharge through the degaussing coils 91 and diode 92 back to capacitor 35 where capacitor 35 becomes charged again. Capacitor 35 then discharges through SCR 37 and degaussing coil 91 to begin another cycle. Losses in the circuit components will cause the degaussing current to decrease each cycle, so that the degaussing current rings in an AC manner down to zero, as shown in FIG. 3(B), thereby demagnetizing the metallic parts of the cathode ray tube 13 and the video display apparatus. The degaussing operation occurs in approximately 5 milliseconds, while the vertical deflection current is still substantially zero. As previously described, the SCR is triggered for approximately 12 milliseconds which is sufficiently long that degaussing is completed, at time t5 as shown in FIG. 3(B), while the SCR is conducting. This prevents any residual degaussing current from remagnetizing the cathode ray tube after the SCR 37 is turned off.

The previously described degaussing circuit, which operates only when the vertical deflection current is substantially zero, is therefore not affected by stray flux from the vertical deflection winding. The degaussing circuit may be utilized while the video display apparatus is operating, merely by decreasing the voltage to flip-flop 43, allowing it to reset. Frequent movement of the video display apparatus will not pose any problems as degaussing may be performed repeatedly without any waiting period.

What is claimed is:

1. A degaussing circuit for a cathode ray tube of a video display apparatus incorporating means for providing field and line rate deflection currents during a field and line deflection interval through a deflection yoke disposed on said cathode ray tube, said degaussing circuit comprising:
    a source of voltage;
    a capacitor charged from said source of voltage;
    a degaussing coil disposed about said cathode ray tube;
    means providing an output signal as an indication of substantially zero deflection current; and
    switch means responsive to said output signal for coupling said capacitor to said degaussing coils for providing a decaying alternating current flow in said degaussing coil, said alternating current decaying substantially to zero during a fraction of said field deflection interval.

2. The arrangement defined in claim 1, wherein said means providing an output signal comprises a comparator.

3. The arrangement defined in claim 1, wherein said switch means comprises an SCR coupled in parallel with a diode.

4. The arrangement defined in claim 3, whereby said alternating current flow comprises a first current path through said SCR and a second current path through said diode, said first current path permitting current flow in the opposite direction permitted by said second current path.

5. In a video display apparatus incorporating a cathode ray tube and means for generating horizontal and vertical deflection current, a degaussing circuit for said cathode ray tube comprising:
    a voltage source;
    a capacitor charged from said voltage source;
    a degaussing coil disposed about said cathode ray tube;
    means for sampling said vertical deflection current;
    means providing an output signal when said vertical deflection current is substantially zero;
    means responsive to said output signal for discharging said capacitor through said degaussing coil to provide an alternating degaussing current flow, said degaussing current decaying to substantially zero while said vertical deflection current is still substantially zero.

* * * * *